(12) United States Patent
Kammermeier

(10) Patent No.: US 8,251,621 B2
(45) Date of Patent: Aug. 28, 2012

(54) DEVICE FOR SUPPLYING COOLANT INTO A SHANK OF A ROTARY TOOL AS WELL AS A ROTARY TOOL, IN PARTICULAR A DRILL

(75) Inventor: Dirk Kammermeier, Stein (DE)

(73) Assignee: Kennametal Inc., Latrobe, PA (US)

( * ) Notice: Subject to any disclaimer, the term of this patent is extended or adjusted under 35 U.S.C. 154(b) by 1174 days.

(21) Appl. No.: 12/101,780

(22) Filed: Apr. 11, 2008

(65) Prior Publication Data

US 2008/0260479 A1 Oct. 23, 2008

Related U.S. Application Data

(63) Continuation-in-part of application No. PCT/EP2006/009728, filed on Oct. 9, 2006.

(51) Int. Cl.
*B23Q 11/10* (2006.01)

(52) U.S. Cl. .............. 409/136; 279/20; 408/56; 408/57; 409/234

(58) Field of Classification Search ............... 279/20; 408/56, 57, 59, 226, 239 A; 409/135–136, 409/234; *B23B 51/06*; *B23Q 11/10*
See application file for complete search history.

(56) References Cited

U.S. PATENT DOCUMENTS

| | | | | |
|---|---|---|---|---|
| 3,443,819 A | * | 5/1969 | Benjamin et al. | 279/20 |
| 2006/0029479 A1 | * | 2/2006 | Stoll et al. | 409/136 |

FOREIGN PATENT DOCUMENTS

| | | | | |
|---|---|---|---|---|
| DE | 3814565 A | * | 7/1989 | |
| DE | 19835677 A1 | * | 1/2000 | |
| DE | 10157450 A1 | * | 6/2003 | |
| DE | 103 16 394 | | 11/2004 | |
| EP | 0 240 765 | | 10/1987 | |
| JP | 05212650 A | * | 8/1993 | |
| JP | 08118119 A | * | 5/1996 | |
| JP | 08141878 A | * | 6/1996 | |
| JP | 10138024 A | * | 5/1998 | |
| JP | 10328912 A | * | 12/1998 | |
| JP | 2000042814 A | * | 2/2000 | |
| JP | 2001096440 A | * | 4/2001 | |
| JP | 2005335015 A | * | 12/2005 | |
| WO | WO 2005/037484 | | 4/2005 | |
| WO | WO 2005105351 A1 | * | 11/2005 | |

OTHER PUBLICATIONS

International Search Report PCT/EP2006/009728 and English translation thereof, completed Jan. 15, 2007.

* cited by examiner

*Primary Examiner* — Daniel Howell
(74) *Attorney, Agent, or Firm* — Larry R. Meenan, Esq.

(57) ABSTRACT

A device for supplying coolant into a shank of a rotary tool as well as a rotary tool, in particular a drill. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

20 Claims, 7 Drawing Sheets

DEVICE FOR SUPPLYING COOLANT INTO A SHANK OF A ROTARY TOOL AS WELL AS A ROTARY TOOL, IN PARTICULAR A DRILL

CONTINUING APPLICATION DATA

This application is a Continuation-In-Part application of International Patent Application No. PCT/EP2006/009728, filed on Oct. 9, 2006, which claims priority from Federal Republic of Germany Patent Application No. 10 2005 048 635.5, filed on Oct. 11, 2005. International Patent Application No. PCT/EP2006/009728 was pending as of the filing date of this application. The United States was an elected state in International Patent Application No. PCT/EP2006/009728.

BACKGROUND

1. Technical Field

This application relates to a device for supplying coolant into a shank of a rotary tool as well as a rotary tool, in particular a drill.

2. Background Information

In many existing rotary tools, for example milling cutters, reamers and drills, usually a coolant supply for lubricating and cooling the tool cutting edges is provided. In case of a central coolant supply, the coolant is supplied to the tool through a central coolant channel provided in a chuck in which the tool is clamped. In the chuck, the adjusting element is arranged, which includes the central coolant channel and which is usually arranged in such a way that it is adjustable in axial direction, to enable an adaptation to different tools. The coolant is supplied to cooling-lubricant channels extending in the tool.

More recent developments use minimum-quantity lubrication (MMS) or the so-called absolute-minimum lubrication. In these cases, an aerosol, i.e. a mixture of gas and liquid, is supplied as a coolant to the cutting edges of the tool. For such a minimum-quantity lubrication, a continuous and very uniform coolant supply is of decisive importance to prevent a running dry of the cutting edges. To promote this, high requirements are imposed on the coolant supply.

According to one example of an existing tool, the end of the adjusting element is provided with a truncated or conical adaptor. Complementary thereto, the end of the drill shank is also provided with a conical or truncated fitting or sealing face. At the end of the drill shank, a transverse channel is provided, which is situated opposite an outlet opening of the central coolant channel of the adjusting element. On each end of the transverse channel, an outlet opening of a cooling-lubricant channel passing through the drill is provided, said outlet openings lying in the area of the conical fitting face. The production of the conical design of the shank end with the transverse channel requires a relatively high expenditure.

According to another example of an existing tool, a separate insertion part is provided for an expansion chuck for distributing the coolant from a central coolant channel to the eccentrically arranged cooling-lubricant channels, the shank-side end of the drill abutting on said insertion part with surface contact.

OBJECT OR OBJECTS

An object of at least one possible embodiment of the present application is to essentially guarantee or promote a safe and reliable coolant supply, with minimum-quantity lubrication or a minimized quantity of lubrication, keeping the constructive expenditure low.

SUMMARY

At least one possible embodiment of the present application teaches a device for supplying coolant into a shank of a rotary tool, wherein an adjusting element is provided, which includes a rear partial area having a central coolant channel as well as a front partial area having on its end a sealing face in the shape of an envelope of cone for the shank. In an adaptor in the shank area, a separate distributing element is provided, having an inlet opening as well as several branch channels branching from this inlet opening, for a distribution of the coolant to eccentrically arranged cooling-lubricant channels of the rotary tool or drill.

This arrangement achieves a separation between sealing and coolant distribution. Sealing is effected by the sealing face, against which the shank is pressed. Thus, the sealing face forms a kind of fitting face or else a kind of bearing face. The coolant is distributed to the cooling-lubricant channels of the rotary tool by the separate distributing element. As the latter is designed as a separate element, i.e. an element which is not integrally connected with the adjusting element, the distributing element can have relatively complex geometries at low manufacturing costs. It is possible to design the branching inside the distributing element in such a way that an interruption of the coolant flow is securely prevented.

In at least one possible embodiment of the present application, a peripheral collar of the adaptor, comprising the sealing face in the shape of an envelope of cone and forming the latter, protrudes in axial direction over the distributing element. The axial height of the distributing element is, therefore, smaller than the axial height or depth of the adaptor. Through this measure, a constructively extremely simple and, at the same time, secure sealing between an insertion chamfer, usually provided at the shank end of the drill, and the sealing face. The sealing of the rotary tool is effected essentially exclusively through the insertion chamfer usually provided anyhow. The latter can without problems be formed with high accuracy, so that a sufficient sealing is achieved with low manufacturing costs. As the chamfer has as a rule only a small height, a relatively high surface pressing force and thus a secure sealing effect is achieved.

According to at least one possible embodiment of the present application, the axial height of the sealing face, i.e. its extension in axial direction, is adapted to a chamfer provided on the shank end of the rotary tool.

In at least one possible embodiment of the present application, the distributing element is designed as an insertion part located in the adaptor. Therefore, the distributing element is simple to mount, without requiring any special tool. In at least one possible embodiment of the present application, the insertion part is fixed in the adaptor by means of a glue. In at least one possible embodiment of the present application, a rotational fixation is provided, in such a way that the drill can only be inserted in a defined rotational position, so that it is essentially guaranteed that the outlet openings of the coolant channels of the drill shank are aligned with those of the distributing element.

According to at least one possible embodiment in the present application, the insertion part is fixed on the shank end of the drill, as an alternative to its fixation in the adaptor. Therefore, the distributing element is only inserted into the adaptor when the drill shank is being clamped in the chuck. In at least one possible embodiment of the present application, fixation is effected by means of a glue. The design as a separate part and the subsequent fixation on the shank end enables a simple and cost-advantageous manufacture. At the same time, the fixation on the drill shank promotes a defined and interruption-free connection of the branch channels to the cooling-lubricant channels of the drill.

In at least one possible embodiment of the present application, different distributing elements are provided for different drills so that, depending on the type of drill, an optimum coolant supply and, at the same time, a good sealing effect is achieved. In at least one possible embodiment of the present application, the differently designed distributing elements can be distinguished by a marking, such as a color marking.

According to at least one possible embodiment of the present application, the distributing element has the shape of a truncated cone. At the same time, the adaptor, too has the shape of a truncated cone, so that it is essentially guaranteed that the distributing elements is located in the adaptor with a fit as accurate and positive as possible. The adaptor has a larger axial height than the distributing element, in such a manner that it is essentially guaranteed that a sealing is effected between the chamfer of the rotary tool and the sealing face.

To achieve a constructive embodiment as simple as possible, in at least one possible embodiment of the present application, the sealing face forms the end-side part of the truncated cone-shaped adaptor, i.e. the sealing face merges seamlessly into the truncated cone-shaped adaptor and is a part of the envelope of cone of the adaptor.

Furthermore, in at least one possible embodiment of the present application, the distributing element is axially spaced from an outlet opening of the central coolant channel. The inlet opening of the distributing element is, therefore, not directly adjacent to the outlet opening, but there is a space between these two openings, amounting, for example, to one tenth to one twentieth of the total height of the adaptor. In this way, it is essentially guaranteed that the envelope of cone of the distributing element rests on the corresponding envelope of cone of the adaptor in a defined manner, so that a sealing effect is additionally achieved through these two surfaces in the shape of envelopes of cone.

To promote a secure sealing against the tool shank and to promote at the same time an optimum inflow and overflow behavior from the distributing element into the cooling-lubricant channels of the tool, the underside of the truncated cone-shaped distributing element rests flatly on the shank end when the tool is chucked. For this purpose, the underside of the truncated cone-shaped distributing element is retracted from the outer edge of the adaptor by the height of the chamfer and thus of the sealing face. In the variant in which the distributing element is fastened on the shank end, this is automatically realized.

According to at least one possible embodiment of the present application, the distributing element is designed as a plastic part. On the one hand, this enables an easy manufacture. On the other hand, by choosing a material which is softer than metal and resilient, the distributing element is compressible, at least within a certain tolerance margin. This guarantees or essentially guarantees, on the one hand, a secure seating of the drill shank on the sealing face. At the same time, it offers the possibility to form an additional sealing via the distributing element. Alternatively to using plastic, the distributing element is made of rubber or light metal.

In view of a coolant supply as uninterrupted as possible, the inlet opening is designed as a central hole aligned with the coolant channel, i.e. a hole having the same diameter as the outlet opening of the coolant channel in at least one possible embodiment of the present application. Furthermore, in at least one possible embodiment of the present application, the two channels extend from the central inlet opening obliquely outwards without bends, or without substantial bends, i.e. in the diversion area inside the distributing element, there are no abrupt turns and no 90° turns, which might lead to undesirably high flow turbulences and thus also to a demulsification.

At least one possible embodiment of the present application teaches a rotary tool or drill having a shank and several cooling-lubricant channels extending therein, a separate distributing element including a central inlet opening from which branch channels lead to the cooling-lubricant channels being fixed at the shank end, wherein the shank end is flattened and designed with a peripheral chamfer in the shape of an envelope of cone and the distributing element is fixed on the flattened front face and is surrounded by the chamfer.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

At least one possible embodiment of the present application is explained in greater detail below with reference to the accompanying drawings, in which.

DESCRIPTION OF EMBODIMENT OR EMBODIMENTS

In the figures, parts having the same effect or features are marked with the same reference numbers.

Figure 1:
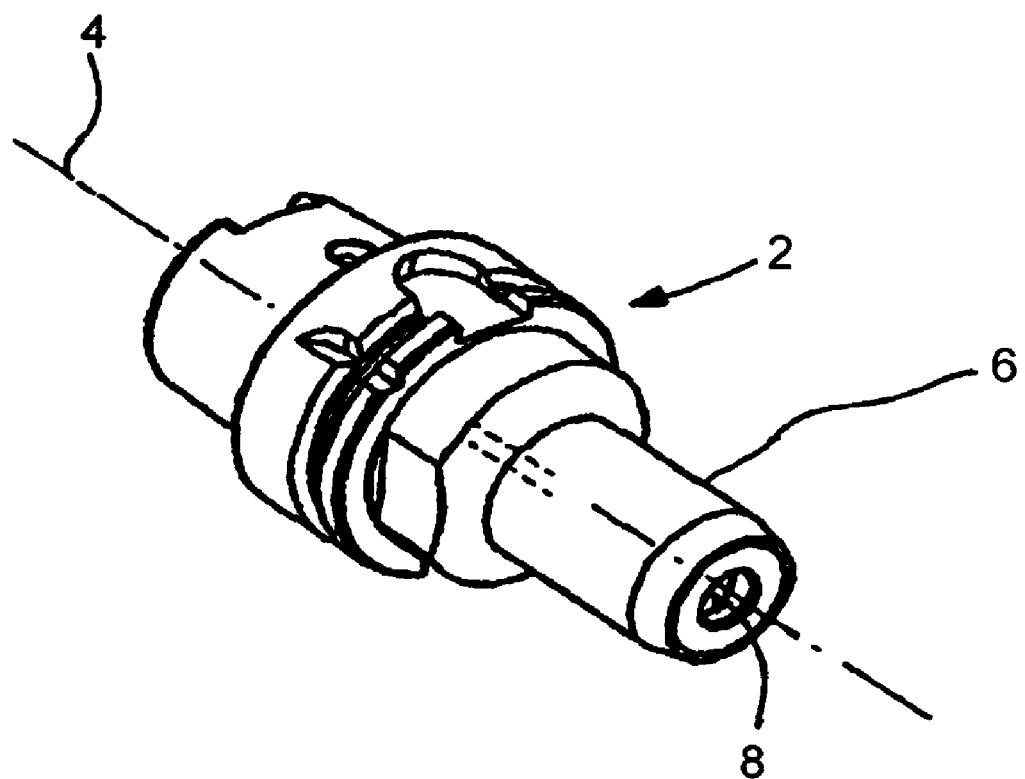
FIG. 1 is a perspective view of a chuck.

According to FIG. 1, a chuck 2 extends in axial direction 4 from a rear end to a front-side tool adaptor 6. The tool adaptor 6 includes a clamping hole 8 for the insertion of the shank 10 of a drill or a twist drill. Only the shank 10 of this drill is shown in FIG. 2 to 5. The chuck 2 shown in FIG. 1 is designed as a so-called expansion chuck.

Figure 2:
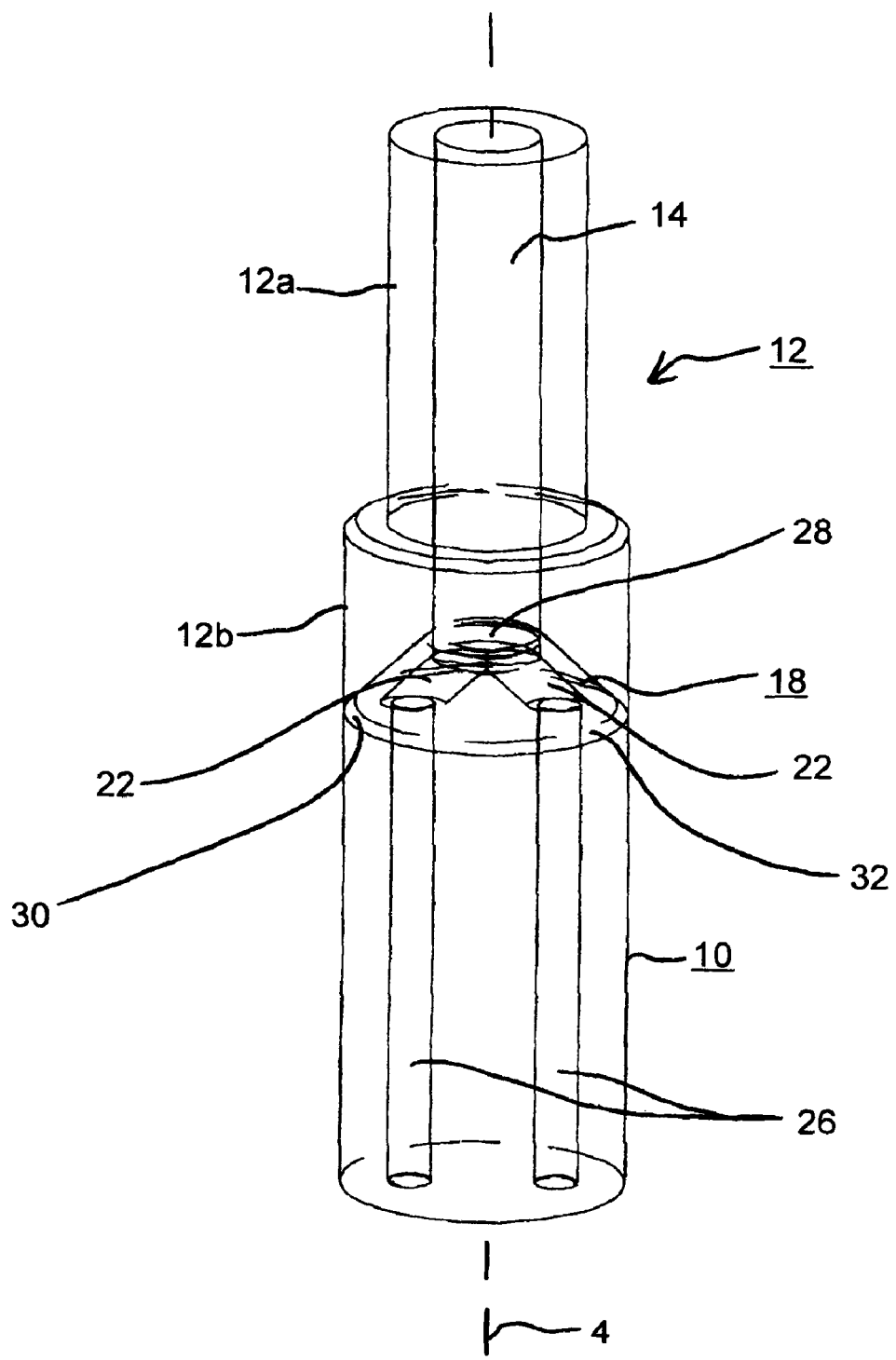
FIG. 2 is a perspective view of an adjusting element with a shank end of a drill arranged therein.
Figure 3:
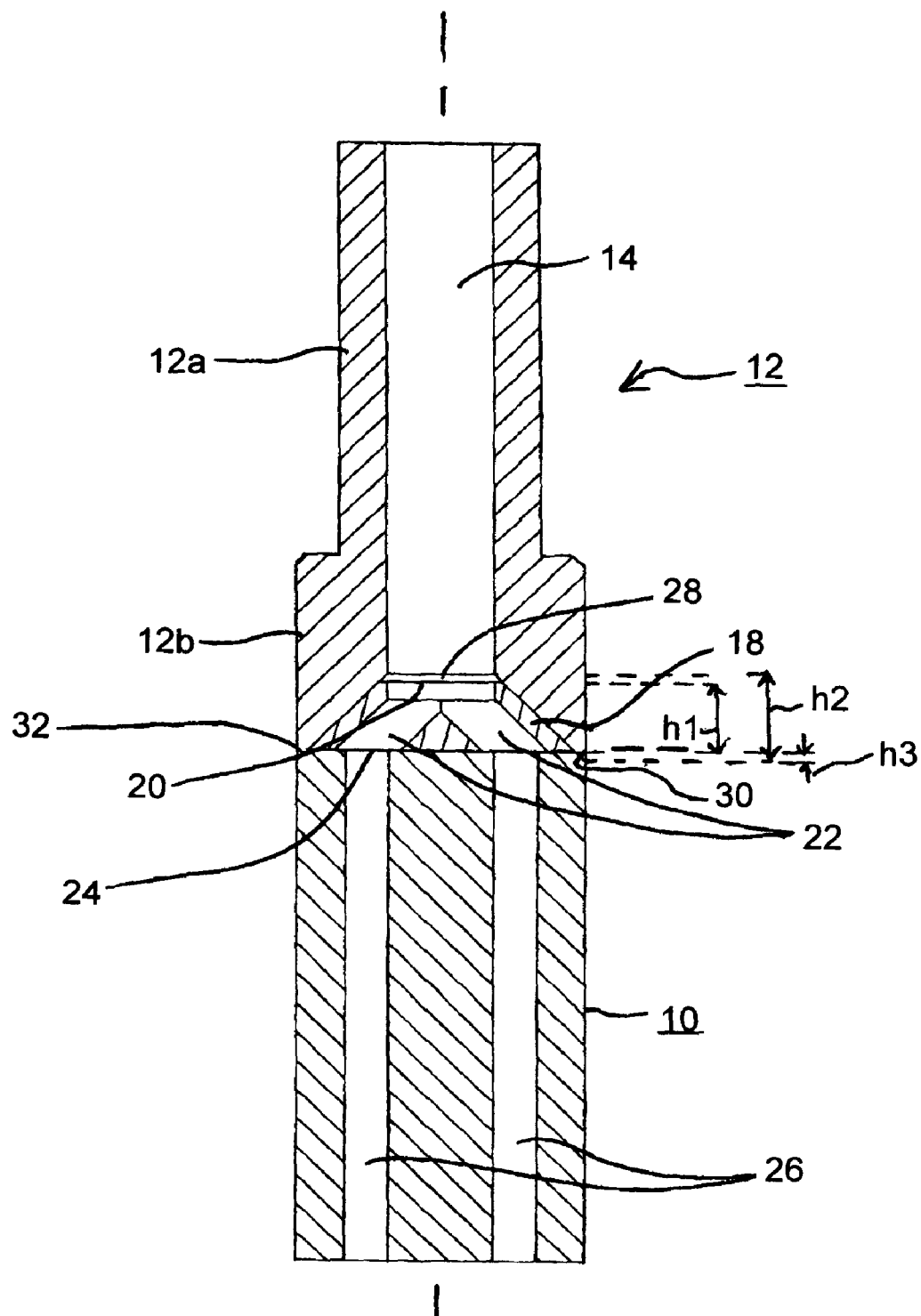
FIG. 3 is a sectional view of FIG. 2 in axial direction.
Figure 4:
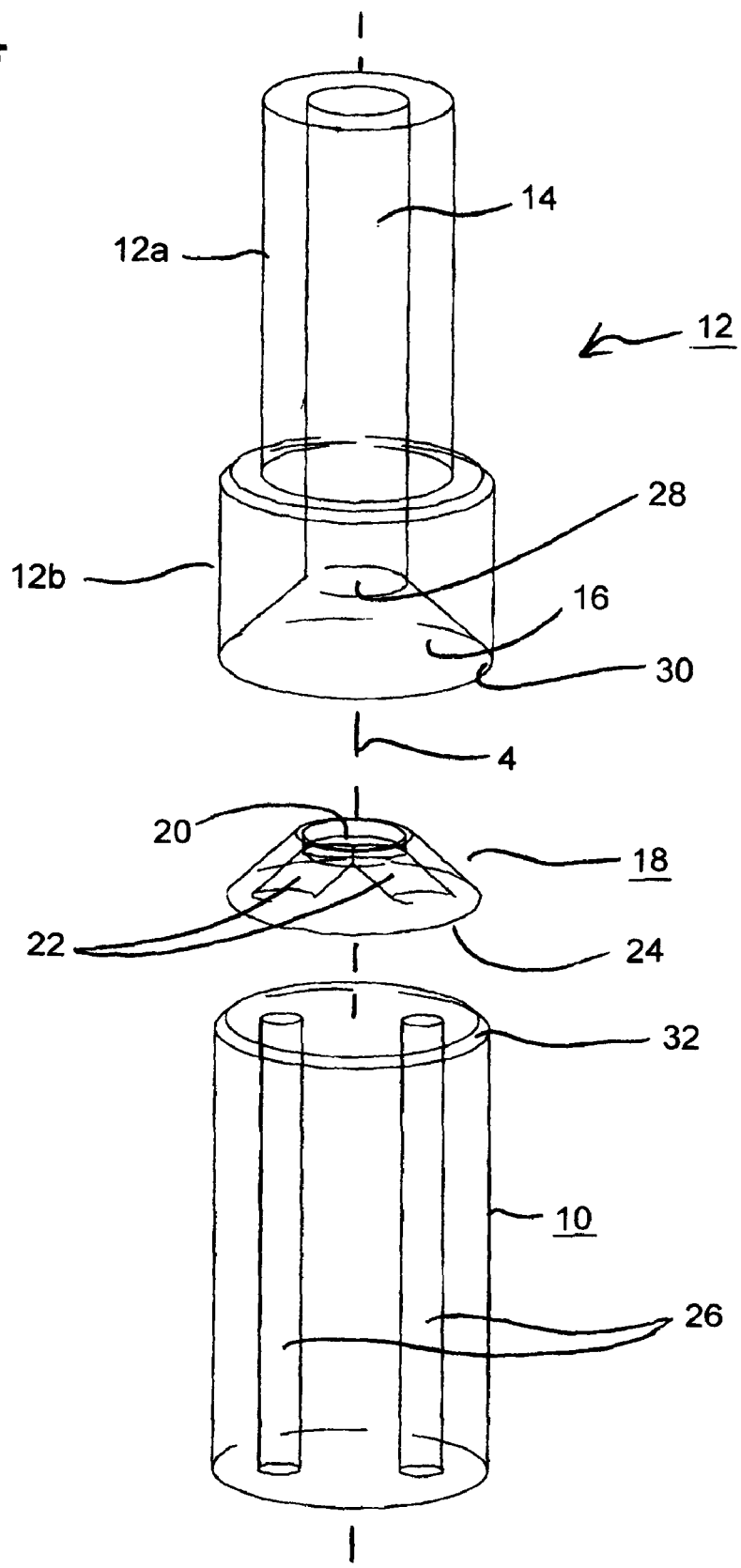
FIGS. 4 and 4A both show an exploded view of the elements shown in FIG. 2.

FIGS. 2 to 4 show different views of an adjusting element 12 with an end of the shank 10, part of which is shown. The adjusting element 12 is arranged in the chuck 2, adjacent to the clamping hole 8, and is usually displaceable in axial direction 4.

In the embodiment shown, the adjusting element 12 is designed in the manner of a cylindrical tube and comprises a rear partial area 12a, on the front side of which, in the direction of the shank 10, a front partial area 12b including a thickened wall area is adjacent. The adjusting element 12 includes a central through hole forming a central coolant channel 14. The front partial area 12b includes a truncated cone-shaped adaptor 16 which opens at the front in axial direction 4.

As is also evident from the figures, the shank area 12b as well as the shank 10 have identical outer diameters, so that their outer surfaces are aligned to each other.

Furthermore, a distributing element 18 is provided as a separate insertion part, which, in at least one possible embodiment of the present application, is made of plastic and is also designed in the manner of a truncated cone, complementarily to the adaptor 16. Alternatively, the distributing element 18 can also be made of rubber or light metal. The distributing element 18 includes a circular inlet opening 20 for the coolant, from which in the exemplary embodiment two branch channels 22 branch off in the manner of a Y. Both branch channels 22 exit on an underside 24 of the truncated cone.

The shank 10 includes in the exemplary embodiment two eccentrically arranged cooling-lubricant channels 26 running up to the front-side cutting edges (not shown here) of the drill.

In assembled condition, the inlet opening 20 is aligned with the central coolant channel 14, so that it is arranged opposite an outlet opening 28 of the central coolant channel 14. The outlet opening 28 forms the upper front face of the truncated cone-shaped adaptor 16. As can be seen in FIG. 3, the inlet opening 20 and the outlet opening 28 are slightly spaced from each other in axial direction 4, the space amounting to approximately 1/10 of the entire height h2 of the adaptor 16 and forming a compensation or tolerance margin. The envelopes of cone of the distributing element 18 abut with an accurate fit on the corresponding envelopes of cone of the adaptor 16, the height h1 in axial direction 4 of the distributing element 18 being smaller than the height h2 of the adaptor 16.

Figure 3A:
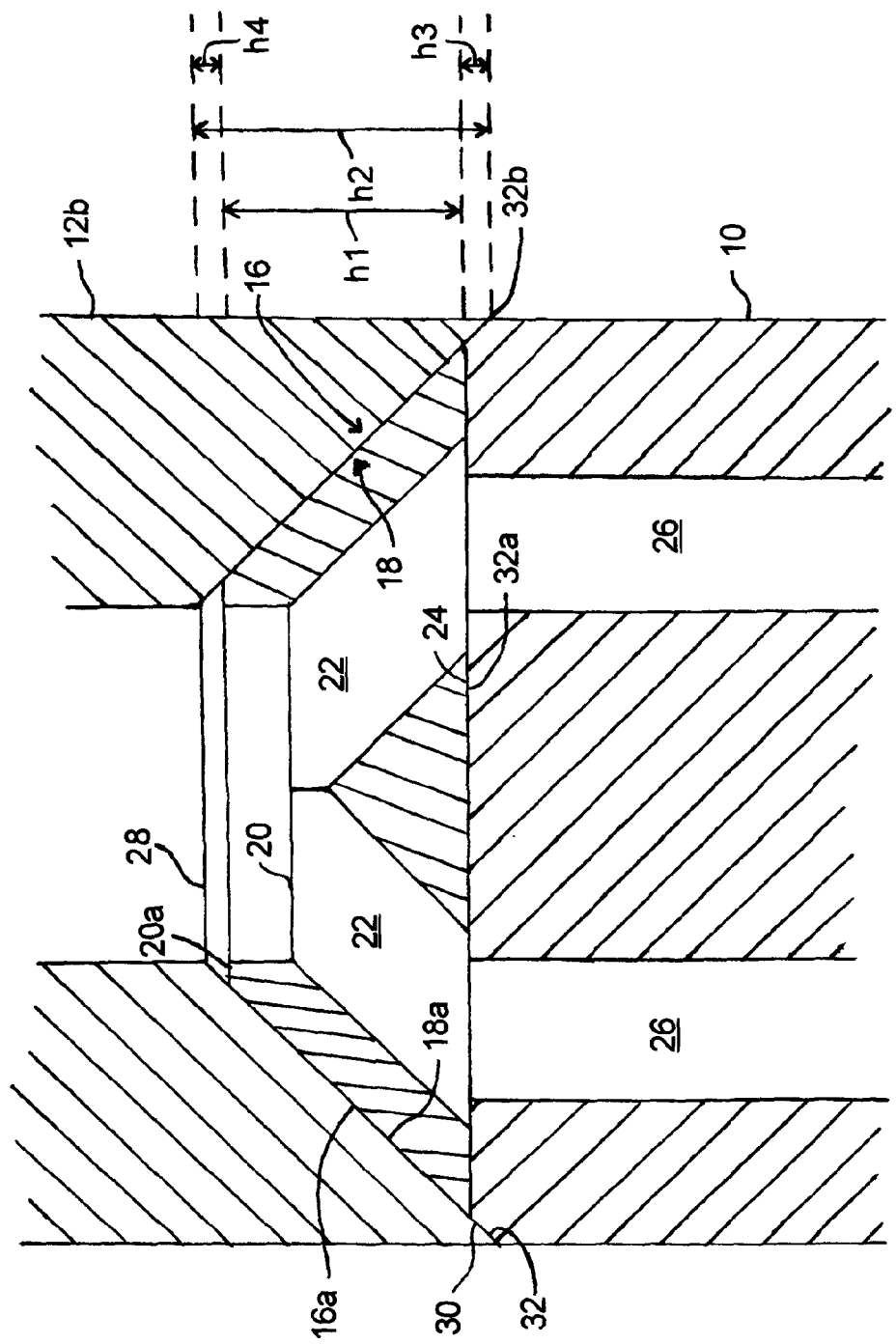
FIG. 3A shows an expanded view of a portion of FIG. 3.

FIG. 3A shows an expanded view of a portion of FIG. 3. As shown in FIGS. 3 and 3A, the height h2 of the adaptor 16 is the overall axial measurement from the outlet opening 28 to the underside 24 of the truncated cone upon assembly. The height h1 of the distributing element 18 substantially corresponds to the axial measurement from a top inlet opening edge 20a of the inlet opening 20 to the underside 24 of the truncated cone and a top chamfer edge 32a of the chamfer 32 upon assembly. The height h3 of the chamfer 32 and sealing face 30 substantially corresponds to the axial measurement from the underside 24 of the truncated cone to a bottom chamfer edge 32b of the chamfer 32 upon assembly. Height h4 is the axial measurement of the spacing from the outlet opening 28 to the top inlet opening edge 20a upon assembly. In at least one possible embodiment of the present application wherein the height h2 of the adaptor 16 is equal to 100 percent, the height h1 of the distributing element 18 is approximately 78 percent, the height h3 of the chamfer 32 and sealing face 30 is approximately 13.5 percent, and the height h4 of the spacing between the outlet opening 28 and the top inlet opening edge 20a is approximately 8.5 percent. In other possible embodiments, the measurements of the height h2 of the adaptor 16, the height h1 of the distributing element 18, the height h3 of the chamfer 32 and sealing face 30, and the height h4 of the spacing between the outlet opening 28 and the top inlet opening edge 20a could vary such that the above-cited percentages also vary. In other possible embodiments, the above-cited percentages could vary by up to twenty percent or more, in increments of one percent, 1/10 of one percent, or even 1/100 of one percent.

In chucked condition, the underside 24 of the truncated cone is arranged in the adaptor 16 with a slight offset to the back, so that a front partial area of the envelope of cone of the adaptor 16 remains free. This front partial area forms a sealing face 30 in the shape of an envelope of cone. The sealing face 30 is a fitting face or bearing face for a chamfer 32, provided on the end side of the shank 10. In assembled condition, the chamfer 32 is pressed against the sealing face 30. Both the chamfer 32 and at least the sealing face 30 are of high quality, so that a secure sealing is achieved through these pairing faces 30,32, avoiding an escape of coolant at this interface. The height h3 of the sealing face 30 corresponds to the height of the chamfer 32. Furthermore, the chamfer 32 and the sealing face 32 have identical cone angles.

Figure 4A:
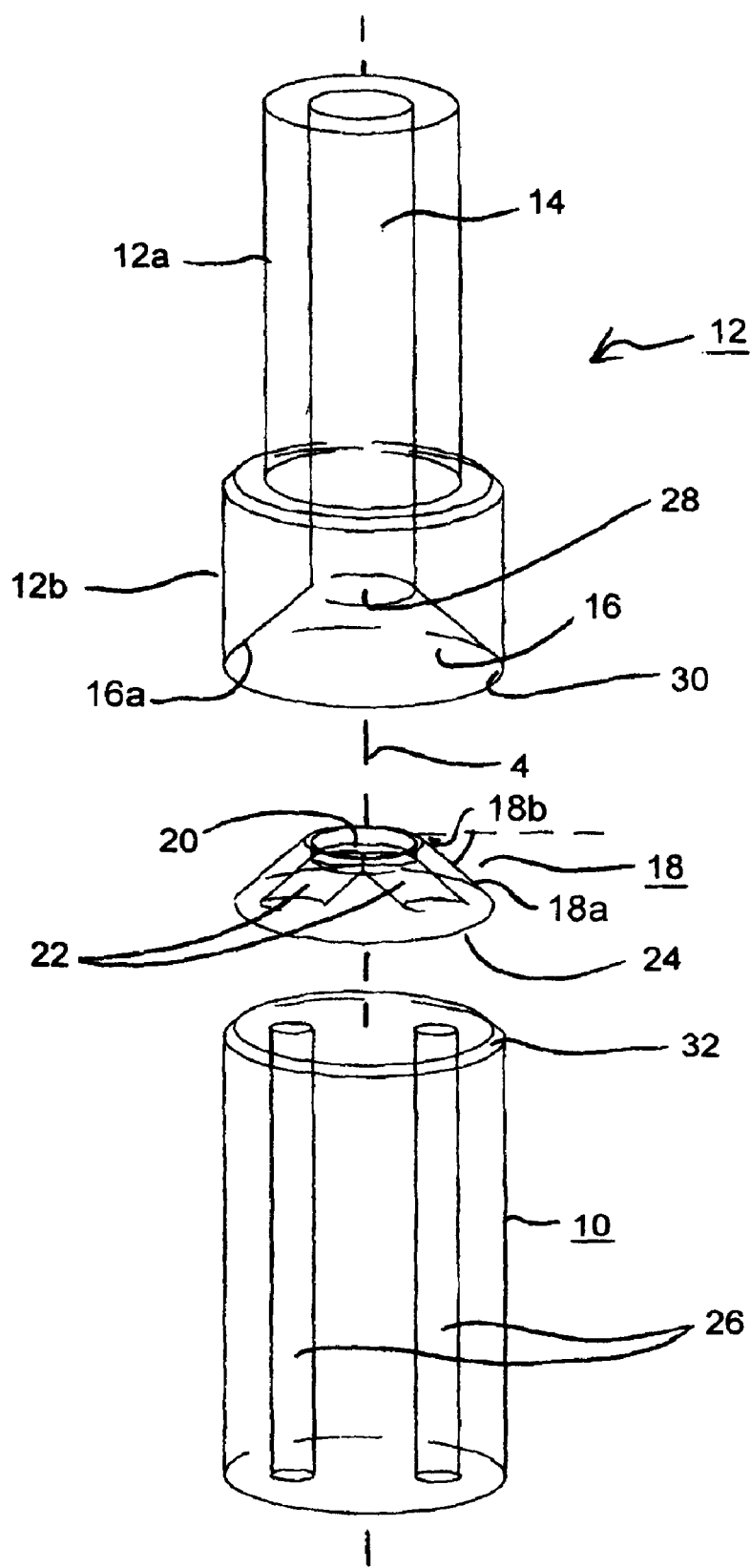
Figure 5:
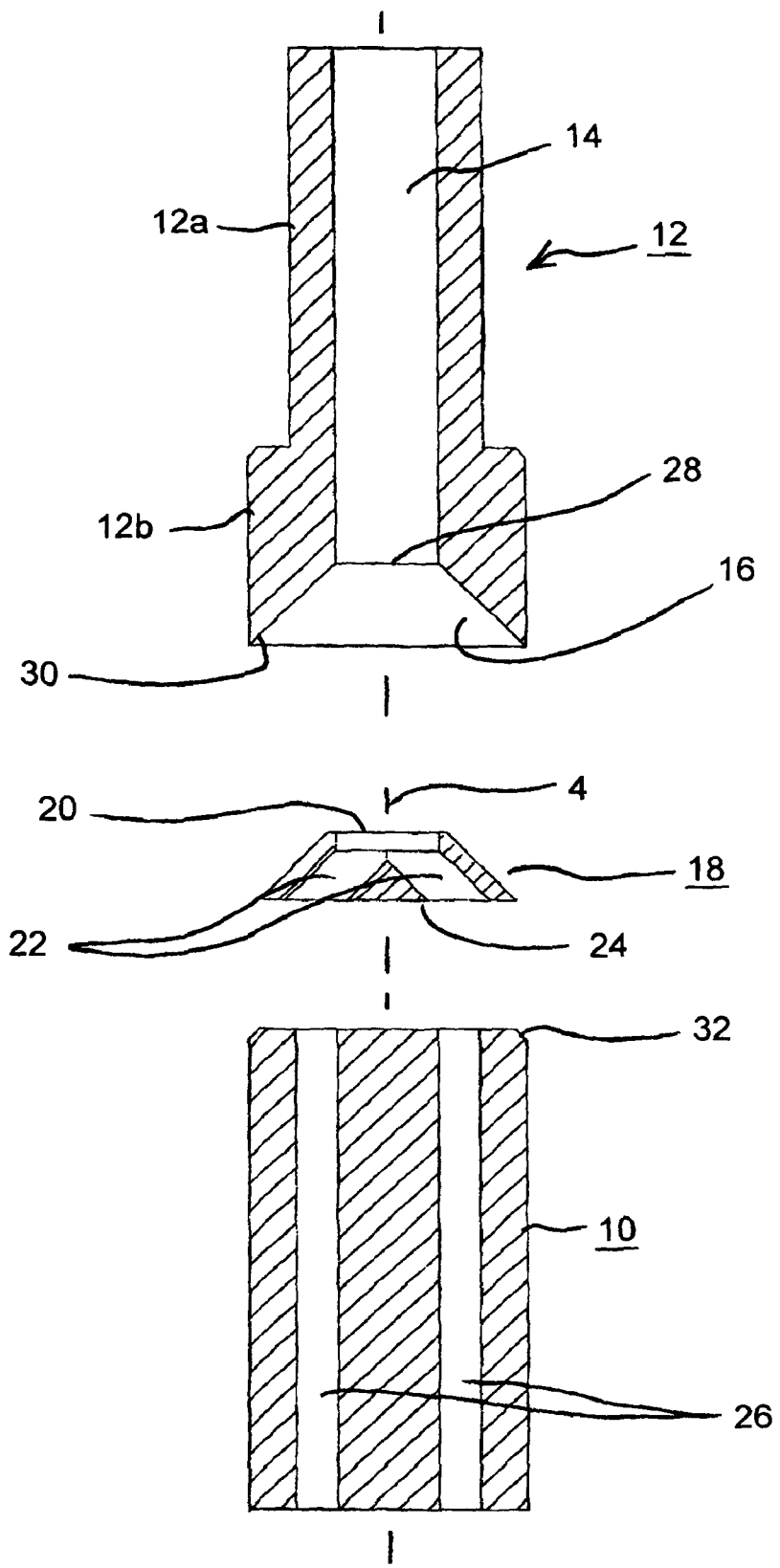
FIG. 5 is a sectional view in axial direction of the exploded view shown in FIG. 4.

FIG. 4A shows a distributing element face portion 18a that mates with an adaptor face portion 16a upon assembly. The distributing element face portion 18a and the adaptor face portion 16a have identical or substantially identical cone angles. The angle of the distributing element face portion 18a corresponds with the angle of the adaptor face portion 16a such that virtually all or all of the distributing element face portion 18a is in contact with at least a substantial portion of the adaptor face portion 16a to effect a sealing relationship upon assembly. In at least one possible embodiment of the present application, the angle 18b of the distributing element face portion 18a is approximately 45 degrees. In other possible embodiments the angle represented by angle 18b could vary by approximately 10 to 15 degrees in one degree or in 1/10 of one degree increments. In at least one possible embodiment of the present application, the angle of the distributing element face portion 18a complements the angle of the adaptor face portion 16a such that the distributing element face portion 18a and adaptor face portion 16a effect a sealing relationship upon assembly. In at least one possible embodiment of the present application, the angle of the distributing element face portion 18a and the angle of the adaptor face portion 16a are such that the distributing element face portion 18a and adaptor face portion 16a effect a relationship upon assembly wherein the distributing element face portion 18a and the adaptor face portion 16a do not bind, and wherein the distributing element face portion 18a and the adaptor face portion 16a do not release from one another.

The design of the sealing face 30 in the shape of a truncated cone with a bevel adapted to the chamfer 32 promotes a reliable sealing. As is evident from FIG. 3, the underside 24 of the truncated cone-shaped distributing element 18 rests flatly on the end-side front face of the shank 10, the outlet openings of the branch channels 22 covering the corresponding outlet openings of the cooling-lubricant channels 26 in the shank 10.

Alternatively to the embodiment of the distributing element 18 shown in the figures, with its straight-lined envelope of cone, the envelope of cone is curved. Thus, the lateral boundary lines of the envelope of cone shown in the sectional view according to FIG. 3, oriented obliquely to the axial direction 4, extend in a curve, and in at least one possible embodiment of the present application extend in a convex curve, i.e. they are spherically bulged outwards. The curved course enables a defined line-like peripheral contact face, which in assembled condition abuts on the counter-face of the shank area 12b and is pressed against the latter. In the areas outside the contact face, the envelope of cone of the distributing element 18 is slightly spaced from the counter-face of the shank area 12b. The contact face has the effect of an additional sealing face.

In at least one possible embodiment of the present application, the distributing element 18 is fixed by gluing on the shank end of the shank 10, so that its flat and direct abutting on the shank end is promoted. In this way, it is also possible to provide in a simple and cost-advantageous manner different distributing elements 18 for different types von drills, so that for each drill type, a reliable and secure coolant supply through a drill-specific distributing element 18 is promoted. A complicated machining of the shank end, for example its direct truncated-cone design, or also the forming of a transverse channel for distributing the coolant is not necessary. Rather is the shank end designed as a plane face which is oriented perpendicularly to the axial direction 4 and which only comprises the outlet openings to the cooling-lubricant channels 26.

The distributing element 18 fastened to the drill shank 10 also promotes a secure sealing event in different drills, because different drill diameters are compensated through the truncated-cone design of the adaptor 16, the bearing face of the respective chamfer 32 just shifting in axial direction. The sealing face 30 is, therefore, not static, but it is defined through the respective drill-specific bearing face inside the adaptor 16.

In operation, the chuck 2 is inserted into a machine tool which provides a central coolant supply. The shank 10 of the drill is fastened in the clamping hole 8, namely such that the chamfer 32 of the shank 10 abuts on the sealing face 30, as shown in FIG. 2 to 5.

During the metal-cutting operation, coolant is fed by the central coolant supply with a certain pressure into the coolant channel 14, so that the coolant is guided to the cutting edges through the distributing element 18 and the cooling-lubricant channels 26. As lubrication, a so-called minimum-quantity lubrication is applied. For this purpose, the coolant is an aerosol comprising of a large share of gas and small quantities of liquid lubricant. The embodiment chosen in the present case promotes a reliable coolant supply to the cutting edges and avoids an interruption of the coolant flow.

The design of the distributing element 18, in which the distribution of the coolant is effected without abrupt diversions, is of essential importance. Therefore, the branch channels are designed without bends. Furthermore, the special design of the sealing through the chamfer 32 and the sealing face 30 achieves a secure and, at the same time, constructively simple sealing. Thanks to the design of the distributing element 18 as a separate element, the latter can also be formed with complex geometries for the branch channels 22, with low manufacturing expenditure. The design of the distributing element 18 as a plastic injection-molded part is an advantage.

To promote a safe and reliable coolant supply in a rotary tool or a drill with minimum-quantity lubrication, an adjusting element 12 is provided, including on its end facing a shank 10 of the drill a truncated cone-shaped adaptor 16, in which a separate distributing element 18 is arranged. At the same time, an end-side partial area of the adaptor 16 forms a sealing face 30, against which a chamfer 32 of the shank 10 is pressed in assembled condition. This embodiment promotes with constructively simple means both a secure sealing and a reliable coolant distribution by means of the distributing element 18 to eccentrically arranged cooling-lubricant channels 26 in the shank 10.

The components disclosed in the various publications, disclosed or incorporated by reference herein, may possibly be used in possible embodiments of the present invention, as well as equivalents thereof.

At least one possible embodiment of the present application relates to a device for supplying coolant into a shank of a rotary tool or drill with an adjusting element being provided including a rear partial area having a central coolant channel, and a front partial area facing the rotary tool and having on its end a sealing face in the shape of an envelope of cone for the shank. At least one possible embodiment of the present application also relates to a rotary tool or drill having a shank and cooling-lubricant channels extended therein.

One feature or aspect of an embodiment is believed at the time of the filing of this patent application to possibly reside broadly in a drill with lands, flutes, a shank, and cutting edges in combination with a chucking device for supplying coolant into said drill shank; said drill in combination with said chucking device comprising: an element for feeding coolant into said drill shank, which coolant feeding element comprising a female, frusto-conical portion; a male, frusto-conical distributing element being configured to mate with said female, frusto-conical portion of said coolant feeding element upon assembly to provide a seal between said male, frusto-conical distributing element and said coolant feeding element; said coolant feeding element having a diameter; said coolant feeding element comprising: a central coolant channel being configured and disposed to deliver coolant into said drill shank upon assembly; an outlet opening being disposed at an end of said central coolant channel closest to said drill upon assembly; said outlet opening having a diameter; said male, frusto-conical distributing element comprising an inlet opening being configured to be disposed adjacent said outlet opening upon assembly to receive coolant from said coolant feeding element; said inlet opening having a diameter substantially equal to the diameter of said outlet opening; a plurality of branch channels comprising inlets being disposed immediately adjacent said inlet opening; a base portion of said male, frusto-conical distributing element being disposed opposite of said inlet opening and configured to be disposed immediately adjacent said drill shank upon assembly; said drill shank having a diameter substantially equal to the diameter of said coolant feeding element; said drill shank comprising: cooling lubricant channels; a frusto-conical chamfer at the periphery of said drill shank portion adjacent said male, frusto-conical distributing element; and said frusto-conical chamfer configured to mate with a portion of said female, frusto-conical portion at an extreme end of said coolant feeding element being disposed toward said tip of said drill upon assembly to provide a seal between said chamfer and said coolant feeding element.

One feature or aspect of an embodiment is believed at the time of the filing of this patent application to possibly reside broadly in a drill with lands, flutes, a shank, and cutting edges in combination with a chucking device for supplying coolant into said drill shank; said drill in combination with said chucking device comprising: an element for feeding coolant into said drill shank, which coolant feeding element comprising a female, frusto-conical portion; a distributing element being configured to be disposed between said coolant feeding device and said drill shank; said coolant feeding element comprising: a coolant channel being configured and disposed to deliver coolant into said drill shank upon assembly; an outlet opening being disposed at an end of said coolant channel closest to said drill upon assembly; said distributing element comprising an inlet opening being configured to be disposed to receive coolant from said coolant feeding element upon assembly; a plurality of branch channels comprising inlets being disposed immediately adjacent said inlet opening; a base portion of said distributing element being disposed opposite of said inlet opening and configured to be disposed immediately adjacent said drill shank upon assembly; said drill shank comprising: cooling lubricant channels; a frusto-conical chamfer at the periphery of said drill shank portion adjacent said distributing element; and said frusto-conical chamfer configured to mate with a portion of said female, frusto-conical portion at an extreme end of said coolant feeding element being disposed toward said tip of said drill upon assembly to provide a seal between said chamfer and said coolant feeding element.

One feature or aspect of an embodiment is believed at the time of the filing of this patent application to possibly reside broadly in a drill with lands, flutes, a shank, and cutting edges in combination with a chucking device for supplying coolant into said drill shank; said drill in combination with said chucking device comprising: an element for feeding coolant into said drill shank, which coolant feeding element comprising a female, frusto-conical portion; a male, frusto-conical distributing element being configured to mate with said female, frusto-conical portion of said coolant feeding element upon assembly to provide a seal between said male, frusto-conical distributing element and said coolant feeding element; said coolant feeding element comprising: a coolant channel being configured and disposed to deliver coolant into said drill shank upon assembly; an outlet opening being disposed at an end of said coolant channel closest to said drill upon assembly; said male, frusto-conical distributing element comprising an inlet opening being configured to be disposed adjacent said outlet opening upon assembly to receive coolant from said coolant feeding element; a plurality of branch channels comprising inlets being disposed immediately adjacent said inlet opening; a base portion of said male, frusto-conical distributing element being disposed opposite of said inlet opening and configured to be disposed immediately adjacent said drill shank upon assembly; said drill shank comprising: cooling lubricant channels; a frusto-conical chamfer at the periphery of said drill shank portion adjacent said male, frusto-conical distributing element; and said frusto-conical chamfer configured to mate with a portion of said female, frusto-conical portion at an extreme end of said coolant feeding element being disposed toward said tip of said drill upon assembly to provide a seal between said chamfer and said coolant feeding element.

One feature or aspect of an embodiment is believed at the time of the filing of this patent application to possibly reside broadly in a rotary tool with lands, flutes, a shank, and cutting edges in combination with a chucking device for supplying coolant into said rotary tool shank; said rotary tool in combination with said chucking device comprising: an element for feeding coolant into said rotary tool shank, which coolant feeding element comprising a female, frusto-conical portion; a male, frusto-conical distributing element being configured to mate with said female, frusto-conical portion of said coolant feeding element upon assembly to provide a seal between said male, frusto-conical distributing element and said coolant feeding element; said coolant feeding element having a diameter; said coolant feeding element comprising: a central coolant channel being configured and disposed to deliver coolant into said rotary tool shank upon assembly; an outlet opening being disposed at an end of said central coolant channel closest to said rotary tool upon assembly; said outlet opening having a diameter; said male, frusto-conical distributing element comprising an inlet opening being configured to be disposed adjacent said outlet opening upon assembly to receive coolant from said coolant feeding element; said inlet opening having a diameter substantially equal to the diameter of said outlet opening; a plurality of branch channels comprising inlets being disposed immediately adjacent said inlet opening; a base portion of said male, frusto-conical distributing element being disposed opposite of said inlet opening and configured to be disposed immediately adjacent said rotary tool shank upon assembly; said rotary tool shank having a diameter substantially equal to the diameter of said coolant feeding element; said rotary tool shank comprising: cooling lubricant channels; a frusto-conical chamfer at the periphery of said rotary tool shank portion adjacent said male, frusto-conical distributing element; and said frusto-conical chamfer configured to mate with a portion of said female, frusto-conical portion at an extreme end of said coolant feeding element being disposed toward said tip of said rotary tool upon assembly to provide a seal between said chamfer and said coolant feeding element.

One feature or aspect of an embodiment is believed at the time of the filing of this patent application to possibly reside broadly in a rotary tool with lands, flutes, a shank, and cutting edges in combination with a chucking device for supplying coolant into said rotary tool shank; said rotary tool in combination with said chucking device comprising: an element for feeding coolant into said rotary tool shank, which coolant feeding element comprising a female, frusto-conical portion; a distributing element being configured to be disposed between said coolant feeding device and said rotary tool shank; said coolant feeding element comprising: a coolant channel being configured and disposed to deliver coolant into said rotary tool shank upon assembly; an outlet opening being disposed at an end of said coolant channel closest to said rotary tool upon assembly; said distributing element comprising an inlet opening being configured to be disposed to receive coolant from said coolant feeding element upon assembly; a plurality of branch channels comprising inlets being disposed immediately adjacent said inlet opening; a base portion of said distributing element being disposed opposite of said inlet opening and configured to be disposed immediately adjacent said rotary tool shank upon assembly; said rotary tool shank comprising: cooling lubricant channels; a frusto-conical chamfer at the periphery of said rotary tool shank portion adjacent said distributing element; and said frusto-conical chamfer configured to mate with a portion of said female, frusto-conical portion at an extreme end of said coolant feeding element being disposed toward said tip of said rotary tool upon assembly to provide a seal between said chamfer and said coolant feeding element.

One feature or aspect of an embodiment is believed at the time of the filing of this patent application to possibly reside broadly in a rotary tool with lands, flutes, a shank, and cutting edges in combination with a chucking device for supplying coolant into said rotary tool shank; said rotary tool in combination with said chucking device comprising: an element for feeding coolant into said rotary tool shank, which coolant feeding element comprising a female, frusto-conical portion; a male, frusto-conical distributing element being configured to mate with said female, frusto-conical portion of said coolant feeding element upon assembly to provide a seal between said male, frusto-conical distributing element and said coolant feeding element; said coolant feeding element comprising: a coolant channel being configured and disposed to deliver coolant into said rotary tool shank upon assembly; an outlet opening being disposed at an end of said coolant channel closest to said rotary tool upon assembly; said male, frusto-conical distributing element comprising an inlet opening being configured to be disposed adjacent said outlet opening upon assembly to receive coolant from said coolant feeding element; a plurality of branch channels comprising inlets being disposed immediately adjacent said inlet opening; a base portion of said male, frusto-conical distributing element being disposed opposite of said inlet opening and configured to be disposed immediately adjacent said rotary tool shank upon assembly; said rotary tool shank comprising: cooling lubricant channels; a frusto-conical chamfer at the periphery of said rotary tool shank portion adjacent said male, frusto-conical distributing element; and said frusto-conical chamfer configured to mate with a portion of said female, frusto-conical portion at an extreme end of said coolant feeding element being disposed toward said tip of said rotary tool upon assembly to provide a seal between said chamfer and said coolant feeding element.

One feature or aspect of an embodiment is believed at the time of the filing of this patent application to possibly reside broadly in a device for supplying coolant into a shank 10 of a rotary tool, having an adjusting element 12 including a rear partial area 12a having a central coolant channel 14 and a front partial area 12b facing towards the rotary tool and having on its end a sealing face 30 in the shape of an envelope of cone for the shank 10, wherein an adaptor 16 of the front partial area 12a, a separate distributing element 18 is provided, which includes an inlet opening 20 as well as several branch channels 22 branching off therefrom, for a distribution of the coolant, and that the sealing face 30 is designed as a peripheral collar on the front face of the adaptor 16 and has an axial height h3, which is adapted to a chamfer 32 provided on the shank end of the rotary tool and which cooperates with said chamfer in assembled condition for sealing purposes.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

Another feature or aspect of an embodiment is believed at the time of the filing of this patent application to possibly reside broadly in the device, wherein the distributing element 18 has an axial height h1, which is smaller than an axial height h2 of the adaptor, and that the sealing face 30 in the shape of an envelope of cone protrudes over the distributing element 18 as a peripheral collar of the adaptor 16.

The appended drawings in their entirety, including all dimensions, proportions and/or shapes in at least one embodiment of the invention, are accurate and are hereby included by reference into this specification.

Yet another feature or aspect of an embodiment is believed at the time of the filing of this patent application to possibly reside broadly in the device, wherein the distributing element 18 is an insertion part located in the adaptor 16.

At least one possible embodiment of the present application relates to a device for supplying coolant into a shank of a rotary tool or drill with an adjusting element being provided, including a rear partial area having a central coolant channel, and a front partial area facing the rotary tool and having on its end a sealing face in the shape of an envelope of cone for the shank.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Still another feature or aspect of an embodiment is believed at the time of the filing of this patent application to possibly reside broadly in the device, wherein the end of the distributing element 18 is fixed on the shank 10.

All, or substantially all, of the components and methods of the various embodiments may be used with at least one embodiment or all of the embodiments, if more than one embodiment is described herein.

A further feature or aspect of an embodiment is believed at the time of the filing of this patent application to possibly reside broadly in the device, wherein differently designed distributing elements 18 are provided for different rotary tools.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

Another feature or aspect of an embodiment is believed at the time of the filing of this patent application to possibly reside broadly in the device, wherein the differently designed distributing elements 18 can be distinguished by a marking or a color marking.

All of the patents, patent applications and publications recited herein, and in the Declaration attached hereto, are hereby incorporated by reference as if set forth in their entirety herein.

Yet another feature or aspect of an embodiment is believed at the time of the filing of this patent application to possibly reside broadly in the device, wherein the distributing element 18 has the shape of a truncated cone.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

Still another feature or aspect of an embodiment is believed at the time of the filing of this patent application to possibly reside broadly in the device, wherein the adaptor 16 has the shape of a truncated cone.

It will be understood that any or all the examples of patents, published patent applications, and other documents which are included in this application and including those which are referred to in paragraphs which state "Some examples of . . . which may possibly be used in at least one possible embodiment of the present application . . . " may possibly not be used or useable in any one or more or any embodiments of the application.

The sentence immediately above relates to patents, published patent applications and other documents either incorporated by reference or not incorporated by reference.

A further feature or aspect of an embodiment is believed at the time of the filing of this patent application to possibly reside broadly in the device, wherein the sealing face 30 forms the end part of the truncated cone-shaped adaptor 16.

All of the patents, patent applications or patent publications, which were cited in the International Search Report dated Jan. 15, 2008, and/or cited elsewhere are hereby incorporated by reference as if set forth in their entirety herein as follows: WO 2005/037484 A2, DE 103 16 394 A1, and EP 0240 765 A2.

Another feature or aspect of an embodiment is believed at the time of the filing of this patent application to possibly reside broadly in the device, wherein the distributing element 18 is axially spaced from an outlet opening 28 of the central coolant channel 14.

The corresponding foreign and international patent publication applications, namely, German Patent Application No. 10 2005 048 635.5, filed on Oct. 11, 2005, having inventor Dirk KAMMERMEIER, and DE-OS 10 2005 048 635.5 and DE-PS 10 2005 048 635.5, and International Application No. PCT/EP2006/009728, filed on Oct. 9, 2006, having WIPO Publication No. WO 2007/042238 A1 and inventor Dirk KAMMERMEIER, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

Yet another feature or aspect of an embodiment is believed at the time of the filing of this patent application to possibly reside broadly in the device, wherein an underside 24 of the truncated cone facing towards the shank is located inside the adaptor 16, retracted from the shank-side edge of the adaptor 16.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

Still another feature or aspect of an embodiment is believed at the time of the filing of this patent application to possibly reside broadly in the device, wherein the distributing element 18 is designed as a plastic part.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

A further feature or aspect of an embodiment is believed at the time of the filing of this patent application to possibly reside broadly in the device, wherein the inlet opening 20 is designed as a central hole aligned with the coolant channel 14.

The details in the patents, patent applications and publications may be considered to be incorporable, at applicant's option, into the claims during prosecution as further limitations in the claims to patentably distinguish any amended claims from any applied prior art.

Another feature or aspect of an embodiment is believed at the time of the filing of this patent application to possibly reside broadly in the device, wherein the branch channels 22 extend from the central inlet opening 20 obliquely outwards.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

Yet another feature or aspect of an embodiment is believed at the time of the filing of this patent application to possibly reside broadly in a rotary tool or drill having a shank 10 and several cooling-lubricant channels 26 extending therein, a separate distributing element 18 including a central inlet opening 20 from which branch channels 22 lead to the cooling-lubricant channels 26 being fixed at the shank end, wherein the shank end is flattened and designed with a peripheral chamfer 32 in the shape of an envelope of cone and that the distributing element 18 is fixed on the flattened front face and is surrounded by the chamfer 32.

One feature or aspect of an embodiment is believed at the time of the filing of this patent application to possibly reside broadly in a drill with lands, flutes, a shank, and cutting edges in combination with a chucking device for supplying coolant into said drill shank; said drill in combination with said chucking device comprising: an element for feeding coolant to said drill shank, which coolant feeding element comprises a female, frusto-conical portion; a male, frusto-conical distributing element being configured to mate with said female, frusto-conical portion of said coolant feeding element upon assembly to provide a seal, between said male, frusto-conical distributing element and said coolant feeding element, sufficient to minimize leakage of coolant between said male, frusto-conical distributing element and said female, frusto-conical portion of said coolant feeding element; said coolant feeding element comprising: a coolant channel being configured and disposed to deliver coolant from said coolant feeding element to said male, frusto-conical distributing element upon assembly; an outlet opening being disposed at an end of said coolant channel closest to said drill and being adjacent to said male, frusto-conical distributing element upon assembly; said male, frusto-conical distributing element comprising at least one channel; said at least one channel comprising at least one inlet opening being configured to receive coolant from said coolant feeding element; a base portion of said male, frusto-conical distributing element being disposed on a side opposite to said at least one inlet opening of said at least one channel, which said base portion is configured to be disposed immediately adjacent said drill shank upon assembly; said at least one channel comprising at least one outlet in said base portion of said male, frusto-conical distributing element; said drill shank being disposed adjacent said base portion of said male, frusto-conical distributing element upon assembly; said drill shank comprising: at least one cooling lubricant channel being disposed to receive coolant from said at least one channel in said male, frusto-conical distributing element; a frusto-conical chamfer being disposed at the periphery of said drill shank portion and being disposed adjacent to said distributing element upon assembly; and said frusto-conical chamfer being configured to mate with a portion of said female, frusto-conical portion of said coolant feeding element, at an extreme end of said coolant feeding element being disposed toward said tip of said drill, upon assembly to provide a seal, between said chamfer and said coolant feeding element, sufficient to minimize leakage of coolant between said female, frusto-conical portion of said coolant feeding element and said frusto-conical chamfer.

Another feature or aspect of an embodiment is believed at the time of the filing of this patent application to possibly reside broadly in the drill in combination with said chucking device, including at least one of (A), (B), (C), (D), (E), (F), (G), (H), (I), (J), and (K), wherein (A), (B), (C), (D), (E), (F), (G), (H), (I), (J), and (K), comprise: (A) said portion of said female, frusto-conical portion of said coolant feeding element that mates with said frusto-conical chamfer comprises a sealing face designed as a peripheral collar on said coolant feeding element; and said sealing face has an axial height and angle, with respect to the central, longitudinal axis of said drill in combination with said chucking device, which is complementary to said frusto-conical chamfer for sealing purposes; (B) said male, frusto-conical distributing element has an axial height; said coolant feeding element has an axial height; and the axial height of said male, frusto-conical distributing element is smaller than the axial height of said coolant feeding element; (C) said base of said male, frusto-conical distributing element is fixed on said drill shank upon assembly; (D) a plurality of differently designed said male, frusto-conical distributing elements are provided for different drills; (E) said plurality of differently designed said male, frusto-conical distributing elements can be distinguished by a marking or a color marking; (F) said male, frusto-conical distributing element is axially spaced away from said outlet opening of said coolant channel of said coolant feeding element upon assembly; (G) said base of said male, frusto-conical distributing element is disposed inside said female, frusto-conical portion of said coolant feeding element and is disposed away from said sealing face upon assembly; (H) said male, frusto-conical distributing element comprises plastic; (I) said at least one inlet opening of said at least one channel of said male, frusto-conical distributing element is designed as a central hole aligned with said coolant channel of said coolant feeding element; (J) said at least one channel of said male, frusto-conical distributing element extends obliquely outwards away from said at least one central inlet opening; and (K) said coolant feeding element has a diameter; said drill shank has a diameter; and said diameter of said coolant feeding element is substantially equal to said drill shank.

Yet another feature or aspect of an embodiment is believed at the time of the filing of this patent application to possibly reside broadly in the drill in combination with said chucking device, including all of (A), (B), (C), (D), (E), (F), (G), (H), (I), (J), and (K), wherein (A), (B), (C), (D), (E), (F), (G), (H), (I), (J), and (K), comprise: (A) said portion of said female, frusto-conical portion of said coolant feeding element that mates with said frusto-conical chamfer comprises a sealing face designed as a peripheral collar on said coolant feeding element; and said sealing face has an axial height and angle, with respect to the central, longitudinal axis of said drill in combination with said chucking device, which is complementary to said frusto-conical chamfer for sealing purposes; (B) said male, frusto-conical distributing element has an axial height; said coolant feeding element has an axial height; and the axial height of said male, frusto-conical distributing element is smaller than the axial height of said coolant feeding element; (C) said base of said male, frusto-conical distributing element is fixed on said drill shank upon assembly; (D) a plurality of differently designed said male, frusto-conical distributing elements are provided for different drills; (E) said plurality of differently designed said male, frusto-conical distributing elements can be distinguished by a marking or a color marking; (F) said male, frusto-conical distributing element is axially spaced away from said outlet opening of said coolant channel of said coolant feeding element upon assembly; (G) said base of said male, frusto-conical distributing element is disposed inside said female, frusto-conical portion of said coolant feeding element and is disposed away from said sealing face upon assembly; (H) said male, frusto-conical distributing element comprises a plastic material; (I) said at least one inlet opening of said at least one channel of said male, frusto-conical distributing element is designed as a central hole aligned with said coolant channel of said coolant feeding element; (J) said at least one channel of said male, frusto-conical distributing element extends obliquely outwards away from said at least one central inlet opening; and (K) said coolant feeding element has a diameter; said drill shank has a diameter; and said diameter of said coolant feeding element is substantially equal to said drill shank.

Still another feature or aspect of an embodiment is believed at the time of the filing of this patent application to possibly reside broadly in a rotary tool with lands, flutes, a shank, and cutting edges in combination with a chucking device for supplying coolant into said rotary tool shank; said rotary tool in combination with said chucking device comprising: an element for feeding coolant to said rotary tool shank, which coolant feeding element comprises a female, frusto-conical portion; a male, frusto-conical distributing element being configured to mate with said female, frusto-conical portion of said coolant feeding element upon assembly to provide a seal, between said male, frusto-conical distributing element and said coolant feeding element, sufficient to minimize leakage of coolant between said male, frusto-conical distributing element and said female, frusto-conical portion of said coolant feeding element; said coolant feeding element comprising: a coolant channel being configured and disposed to deliver coolant from said coolant feeding element to said male, frusto-conical distributing element upon assembly; an outlet opening being disposed at an end of said coolant channel closest to said rotary tool and being adjacent to said male, frusto-conical distributing element upon assembly; said male, frusto-conical distributing element comprising at least one channel; said at least one channel comprising at least one inlet opening being configured to receive coolant from said coolant feeding element; a base portion of said male, frusto-conical distributing element being disposed on a side opposite to said at least one inlet opening of said at least one channel, which said base portion is configured to be disposed immediately adjacent said rotary tool shank upon assembly; said at least one channel comprising at least one outlet in said base portion of said male, frusto-conical distributing element; said rotary tool shank being disposed adjacent said base portion of said male, frusto-conical distributing element upon assembly; and said rotary tool shank comprising at least one cooling lubricant channel being disposed to receive coolant from said at least one channel in said male, frusto-conical distributing element.

A further feature or aspect of an embodiment is believed at the time of the filing of this patent application to possibly reside broadly in the rotary tool in combination with said chucking device, wherein: said male, frusto-conical distributing element has an axial height; said coolant feeding element has an axial height; and the axial height of said male, frusto-conical distributing element is smaller than the axial height of said coolant feeding element.

Another feature or aspect of an embodiment is believed at the time of the filing of this patent application to possibly reside broadly in the rotary tool in combination with said chucking device, wherein said base of said male, frusto-conical distributing element is fixed on said rotary tool shank upon assembly.

Yet another feature or aspect of an embodiment is believed at the time of the filing of this patent application to possibly reside broadly in the rotary tool in combination with said chucking device, including at least one of (A) and (B), wherein (A) and (B) comprise: (A) a plurality of differently designed said male, frusto-conical distributing elements are provided for different rotary tools; and (B) a plurality of differently designed said male, frusto-conical distributing elements are provided for different rotary tools; and said plurality of differently designed said male, frusto-conical distributing elements can be distinguished by a marking or a color marking.

Still another feature or aspect of an embodiment is believed at the time of the filing of this patent application to possibly reside broadly in the rotary tool in combination with said chucking device, wherein said male, frusto-conical distributing element is axially spaced away from said outlet opening of said coolant channel of said coolant feeding element upon assembly.

A further feature or aspect of an embodiment is believed at the time of the filing of this patent application to possibly reside broadly in the rotary tool in combination with said chucking device, wherein said male, frusto-conical distributing element comprises a plastic material.

Another feature or aspect of an embodiment is believed at the time of the filing of this patent application to possibly reside broadly in the rotary tool in combination with said chucking device including at least one of (A) and (B), wherein (A) and (B) comprise: (A) said at least one inlet opening of said at least one channel of said male, frusto-conical distributing element is designed as a central hole aligned with said coolant channel of said coolant feeding element; and (B) said at least one channel of said male, frusto-conical distributing element extends obliquely outwards away from said at least one central inlet opening.

Yet another feature or aspect of an embodiment is believed at the time of the filing of this patent application to possibly reside broadly in the rotary tool in combination with said chucking device, wherein said coolant feeding element has a diameter; said rotary tool shank has a diameter; and said diameter of said coolant feeding element is substantially equal to said rotary tool shank.

Still another feature or aspect of an embodiment is believed at the time of the filing of this patent application to possibly reside broadly in a rotary tool with lands, flutes, a shank, and cutting edges in combination with a chucking device for supplying coolant into said rotary tool shank; said rotary tool in combination with said chucking device comprising: an element for feeding coolant to said rotary tool shank, which coolant feeding element comprises a, frusto-conical portion; a distributing element being configured to be disposed between said frusto-conical portion of said coolant feeding device and said rotary tool shank; said coolant feeding element comprising: a coolant channel being configured and disposed to deliver coolant from said coolant feeding element to said distributing element upon assembly; an outlet opening being disposed at an end of said coolant channel closest to said rotary tool and being adjacent to said distributing element upon assembly; said distributing element comprising at least one channel; said at least one channel comprising at least one inlet opening being configured to receive coolant from said coolant feeding element upon assembly; a base portion of said distributing element being disposed on a side opposite to said inlet opening of said at least one channel, which said base portion is configured to be disposed immediately adjacent said rotary tool shank upon assembly; said at least one channel comprising at least one outlet in said base portion of said distributing element; said rotary tool shank being disposed adjacent said base portion of said distributing element upon assembly; said rotary tool shank comprising: at least one cooling lubricant channel being disposed to receive coolant from said at least one channel in said distributing element; a frusto-conical chamfer being disposed at the periphery of said rotary tool shank portion and being disposed adjacent to said distributing element upon assembly; and said frusto-conical chamfer being configured to mate with a portion of said frusto-conical portion of said coolant feeding element at an extreme end of said coolant feeding element being disposed toward said tip of said rotary tool upon assembly to provide a seals between said chamfer and said coolant feeding element, sufficient to minimize leakage of coolant between said coolant feeding element and said chamfer.

A further feature or aspect of an embodiment is believed at the time of the filing of this patent application to possibly reside broadly in the rotary tool in combination with said chucking device, wherein: said portion of frusto-conical portion of said coolant feeding element that mates with said frusto-conical chamfer comprises a sealing face designed as a peripheral collar on said coolant feeding element; and said sealing face has an axial height and angle, with respect to the central, longitudinal axis of said rotary tool in combination with said chucking device, which is complementary to said frusto-conical chamfer for sealing purposes.

Another feature or aspect of an embodiment is believed at the time of the filing of this patent application to possibly reside broadly in the rotary tool in combination with said chucking device, wherein: said distributing element has an axial height; said coolant feeding element has an axial height; and the axial height of said distributing element is smaller than the axial height of said coolant feeding element.

Yet another feature or aspect of an embodiment is believed at the time of the filing of this patent application to possibly reside broadly in the rotary tool in combination with said chucking device, wherein said base of said distributing element is fixed on said rotary tool shank upon assembly.

Still another feature or aspect of an embodiment is believed at the time of the filing of this patent application to possibly reside broadly in the rotary tool in combination with said chucking device, including at least one of (A) and (B), wherein (A) and (B) comprise: (A) a plurality of differently designed said distributing elements are provided for different rotary tools; and (B) a plurality of differently designed said distributing elements are provided for different rotary tools; and said plurality of differently designed said distributing elements can be distinguished by a marking or a color marking.

A further feature or aspect of an embodiment is believed at the time of the filing of this patent application to possibly reside broadly in the rotary tool in combination with said chucking device, wherein said distributing element is axially spaced away from said at least one outlet opening of said coolant channel of said coolant feeding element upon assembly.

Another feature or aspect of an embodiment is believed at the time of the filing of this patent application to possibly reside broadly in the rotary tool in combination with said chucking device, including at least one of (A) and (B), wherein (A) and (B) comprises: (A) said distributing element comprises plastic; and (B) said base of said distributing element is disposed inside said frusto-conical portion of said coolant feeding element and is disposed away from said sealing face upon assembly.

Yet another feature or aspect of an embodiment is believed at the time of the filing of this patent application to possibly reside broadly in the rotary tool in combination with said chucking device, including at least one of (A) and (B), wherein (A) and (B) comprises: (A) said at least one inlet opening of said at least one channel of said distributing element is designed as a central hole aligned with said coolant channel of said coolant feeding element; and (B) said at least one channel of said distributing element extends obliquely outwards away from said at least one central inlet opening.

Still another feature or aspect of an embodiment is believed at the time of the filing of this patent application to possibly reside broadly in the rotary tool in combination with said chucking device, wherein: said coolant feeding element has a diameter; said rotary tool has a diameter; and said diameter of said coolant feeding element is substantially equal to said rotary tool shank.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A drill with lands, flutes, a shank, a tip and cutting edges configured to be held by a chucking device, which chucking device is configured to supply coolant to said drill shank;
    said drill comprising:
    an element for feeding coolant to said drill shank being configured to align with and receive coolant from a coolant source in a chucking device;
    said coolant feeding element comprises a female, frusto-conical portion;
    said female, frusto-conical portion comprising a first diameter and a second diameter;
    said first diameter of said female, frusto-conical portion being smaller than said second diameter of said female, frusto-conical portion;
    said first diameter of said female, frusto-conical portion being disposed toward a chucking device;
    said second diameter of said female, frusto-conical portion being disposed toward said drill tip;
    a male, frusto-conical distributing element comprising a first diameter and a second diameter;
    said first diameter of said male, frusto-conical distributing element being smaller than said second diameter of said male, frusto-conical distributing element;
    said first diameter of said male, frusto-conical distributing element being disposed toward a chucking device;
    said second diameter of said male, frusto-conical distributing element being disposed toward said drill tip;
    said male, frusto-conical distributing element being disposed adjacent to and being configured to mate with said female, frusto-conical portion of said coolant feeding element upon assembly;
    said coolant feeding element comprising:
        a channel being configured and disposed to align with and receive coolant from said coolant feeding element and being configured and disposed to align with and deliver coolant to said male, frusto-conical distributing element;
        an outlet opening being disposed at an end of said coolant feeding element channel and being disposed toward said drill tip and being adjacent to said male, frusto-conical distributing element upon assembly;
    said male, frusto-conical distributing element comprising at least one channel;
    said at least one male, frusto-conical distributing element channel comprising at least one inlet opening being configured to receive coolant from said coolant feeding element channel;
    a base portion of said male, frusto-conical distributing element being disposed on a side of said male, frusto-conical distributing element opposite to said at least one inlet opening of said at least one male, frusto-conical distributing element channel, which said base portion is configured to be disposed immediately adjacent said drill shank;
    said at least one male, frusto-conical distributing element channel comprising at least one outlet in said base portion of said male, frusto-conical distributing element;
    said drill shank being disposed adjacent said base portion of said male, frusto-conical distributing element;
    said drill shank comprising:
        at least one cooling lubricant channel being disposed to receive coolant from said at least one male, frusto-conical distributing element channel;
        a male frusto-conical chamfer being disposed at the periphery of said drill shank and being disposed adjacent to said distributing element upon assembly;
        said male frusto-conical chamfer comprising a first diameter and a second diameter;
        said first diameter of said male frusto-conical chamfer being smaller than said second diameter of said male frusto-conical chamfer;
        said first diameter of said male frusto-conical chamfer being disposed toward a chucking device;
        said second diameter of said male frusto-conical chamfer being disposed toward said drill tip; and
        said male frusto-conical chamfer being configured to mate with a portion of said female, frusto-conical portion of said coolant feeding element, at an extreme end of said coolant feeding element being disposed toward said tip of said drill, upon assembly to provide a seal, between said male frusto-conical chamfer and said coolant feeding element, sufficient to minimize leakage of coolant between said female, frusto-conical portion of said coolant feeding element and said male frusto-conical chamfer.

2. The drill according to claim 1, wherein said portion of said female, frusto-conical portion of said coolant feeding element that mates with said male frusto-conical chamfer comprises a sealing face disposed at the periphery of said coolant feeding element; and
said sealing face has an axial height and angle, with respect to the central, logitudinal axis of said drill, which is complementary to said male frusto-conical chamfer for sealing purposes.

3. The drill according to claim 1, wherein said male, frusto-conical distributing element has an axial height;
said coolant feeding element has an axial height; and
the axial height of said male, frusto-conical distributing element is smaller than the axial height of said coolant feeding element.

4. The drill according to claim 1, wherein said base of said male, frusto-conical distributing element is affixed to said drill shank upon assembly.

5. The drill according to claim 1, wherein a plurality of different said male, frusto-conical distributing elements are provided for different drills.

6. The drill according to claim 1, wherein said plurality of different male, frusto-conical distributing elements comprise a marking or a color marking for identification.

7. The drill according to claim 1, wherein said male, frusto-conical distributing element is axially spaced away from said outlet opening of said coolant channel of said coolant feeding element upon assembly.

8. The drill according to claim 1, wherein said base of said male, frusto-conical distributing element is disposed inside said female, frusto-conical portion of said coolant feeding element and is disposed away from said male frusto-conical chamfer upon assembly.

9. The drill according to claim 1, wherein said male, frusto-conical distributing element comprises plastic.

10. The drill according to claim 1, wherein said at least one inlet opening of said at least one channel of said male, frusto-conical distributing element comprises a cental hole aligned with said coolant channel of said coolant feeding element.

11. The drill according to claim 1, wherein said at least one channel of said male, frusto-conical distributing element extends obliquely outwards away from said at least one central inlet opening.

12. The drill according to claim 1, wherein said coolant feeding element has an outer diameter;
said drill shank has an outer diameter; and
said outer diameter of said coolant feeding element is substantially equal to said outer diameter of said drill shank.

13. The drill according to claim 1, including at least one of (A), (B), (C), (D), (E), (F), (G), (H), (I), (J), and (K), wherein (A), (B), (C), (D), (E), (F), (G), (H), (I), (J), and (K) comprise:
(A) said portion of said female, frusto-conical portion of said coolant feeding element that mates with said male frusto-conical chamfer comprises a sealing face disposed at the periphery of said coolant feeding element; and
said sealing face has an axial height and angle, with respect to the central, logitudinal axis of said drill, which is complementary to said male frusto-conical chamfer for sealing purposes;
(B) said male, frusto-conical distributing element has an axial height;
said coolant feeding element has an axial height; and
the axial height of said male, frusto-conical distributing element is smaller than the axial height of said coolant feeding element;
(C) said base of said male, frusto-conical distributing element is affixed to said drill shank upon assembly;
(D) a plurality of different said male, frusto-conical distributing elements are provided for different drills;
(E) said plurality of different male, frusto-conical distributing elements comprise a marking or a color marking for identification;
(F) said male, frusto-conical distributing element is axially spaced away from said outlet opening of said coolant channel of said coolant feeding element upon assembly;
(G) said base of said male, frusto-conical distributing element is disposed inside said female, frusto-conical portion of said coolant feeding element and is disposed away from said male frusto-conical chamfer upon assembly;
(H) said male, frusto-conical distributing element comprises plastic;
(I) said at least one inlet opening of said at least one channel of said male, frusto-conical distributing element comprises a cental hole aligned with said coolant channel of said coolant feeding element;
(J) said at least one channel of said male, frusto-conical distributing element extends obliquely outwards away from said at least one central inlet opening; and
(K) said coolant feeding element has an outer diameter;
said drill shank has an outer diameter; and
said outer diameter of said coolant feeding element is substantially equal to said outer diameter of said drill shank.

14. The drill according to claim 1, including all of (A), (B), (C), (D), (E), (F), (G), (H), (I), (J), and (K), wherein (A), (B), (C), (D), (E), (F), (G), (H), (I), (J), and (K) comprise:
(A) said portion of said female, frusto-conical portion of said coolant feeding element that mates with said male frusto-conical chamfer comprises a sealing face disposed at the periphery of said coolant feeding element; and
said sealing face has an axial height and angle, with respect to the central, logitudinal axis of said drill, which is complementary to said male frusto-conical chamfer for sealing purposes;
(B) said male, frusto-conical distributing element has an axial height;
said coolant feeding element has an axial height; and
the axial height of said male, frusto-conical distributing element is smaller than the axial height of said coolant feeding element;
(C) said base of said male, frusto-conical distributing element is affixed to said drill shank upon assembly;
(D) a plurality of different said male, frusto-conical distributing elements are provided for different drills;
(E) said plurality of different male, frusto-conical distributing elements comprise a marking or a color marking for identification;
(F) said male, frusto-conical distributing element is axially spaced away from said outlet opening of said coolant channel of said coolant feeding element upon assembly;
(G) said base of said male, frusto-conical distributing element is disposed inside said female, frusto-conical portion of said coolant feeding element and is disposed away from said male frusto-conical chamfer upon assembly;

(H) said male, frusto-conical distributing element comprises plastic;
(I) said at least one inlet opening of said at least one channel of said male, frusto-conical distributing element comprises a cental hole aligned with said coolant channel of said coolant feeding element;
(J) said at least one channel of said male, frusto-conical distributing element extends obliquely outwards away from said at least one central inlet opening; and
(K) said coolant feeding element has an outer diameter;
said drill shank has an outer diameter; and
said outer diameter of said coolant feeding element is substantially equal to said outer diameter of said drill shank.

15. A rotary tool with at least one land, at least one flute, a shank, a tip portion, and at least one cutting edge being configured to be held by a chucking device, which chucking device is configured to supply coolant to said rotary tool shank;
said rotary tool comprising:
a structure configured to operatively feed for feeding coolant to said rotary tool shank, which coolant feeding structure comprises a female, frusto-conical portion;
said female, frusto-conical portion comprising a first diameter and a second diameter;
said first diameter of said female, frusto-conical portion being smaller than said second diameter of said female, frusto-conical portion;
said first diameter of said female, frusto-conical portion being configured to be disposed toward a chucking device upon assembly;
said second diameter of said female, frusto-conical portion being configured to be disposed toward said tip portion of said rotary tool upon assembly;
a male, frusto-conical distributing element comprising a first diameter and a second diameter;
said first diameter of said male, frusto-conical distributing element being smaller than said second diameter of said male, frusto-conical distributing element;
said first diameter of said male, frusto-conical distributing element being configured to be disposed toward a chucking device upon assembly;
said second diameter of said male, frusto-conical distributing element being configured to be disposed toward said tip portion of said rotary tool upon assembly;
said male, frusto-conical distributing element being configured to be disposed adjacent to said female, frusto-conical portion of said coolant feeding structure upon assembly;
said coolant feeding structure comprising:
a channel being configured to be disposed to deliver coolant through said coolant feeding structure to said male, frusto-conical distributing element;
an outlet opening being disposed at an end of said coolant feeding structure channel and being configured to be disposed toward said tip portion of said rotary tool upon assembly and being configured to be disposed adjacent to said male, frusto-conical distributing element upon assembly;
said male, frusto-conical distributing element comprising at least one channel;
said at least one male, frusto-conical distributing element channel comprising at least one inlet opening being configured to receive coolant from said coolant feeding structure channel;
a base portion of said male, frusto-conical distributing element being configured to be disposed on a side of said male, frusto-conical distributing element opposite to said at least one inlet opening of said at least one male, frusto-conical distributing element channel upon assembly, which said base portion is configured to be disposed toward said tip portion of said rotary tool upon assembly;
said at least one male, frusto-conical distributing element channel comprising at least one outlet in said base portion of said male, frusto-conical distributing element;
said rotary tool shank comprising:
at least one cooling lubricant channel being configured to be disposed to receive coolant from said at least one channel in said male, frusto-conical distributing element upon assembly and being configured to be disposed to deliver coolant to said tip portion of said rotary tool upon assembly;
a male frusto-conical chamfer being configured to be disposed adjacent to said distributing element upon assembly; and
said male frusto-conical chamfer being configured to mate with a portion of said female, frusto-conical portion of said coolant feeding structure, at an end of said coolant feeding structure being disposed toward said tip portion of said rotary tool upon assembly to provide a seal between said male frusto-conical chamfer and said coolant feeding structure, sufficient to minimize leakage of coolant between said female, frusto-conical portion of said coolant feeding structure and said male frusto-conical chamfer.

16. The rotary tool according to claim 15, including at least one of (A), (B), (C), (D), (E), (F), (G), (H), (I), (J), and (K), wherein (A), (B), (C), (D), (E), (F), (G), (H), (I), (J), and (K) comprise:
(A) said portion of said female, frusto-conical portion of said coolant feeding structure being configured to mate with said male frusto-conical chamfer upon assembly comprises a sealing face disposed at the periphery of said coolant feeding structure; and
said sealing face has an axial height and angle, with respect to the central, logitudinal axis of said rotary tool, which is complementary to said male frusto-conical chamfer for sealing purposes;
(B) said male, frusto-conical distributing element has an axial height;
said coolant feeding structure has an axial height; and
the axial height of said male, frusto-conical distributing element is smaller than the axial height of said coolant feeding structure;
(C) said base of said male, frusto-conical distributing element is configured to be affixed to said rotary tool shank upon assembly;
(D) a plurality of different said male, frusto-conical distributing elements are provided for different rotary tools;
(E) said plurality of different male, frusto-conical distributing elements comprise a marking or a color marking for identification;
(F) said male, frusto-conical distributing element is configured to be axially spaced away from said outlet opening of said coolant channel of said coolant feeding structure upon assembly;
(G) said base of said male, frusto-conical distributing element is configured to be disposed inside said female, frusto-conical portion of said coolant feeding structure upon assembly and is configured to be disposed away from said male frusto-conical chamfer upon assembly;
(H) said male, frusto-conical distributing element comprises plastic;

(I) said at least one inlet opening of said at least one channel of said male, frusto-conical distributing element comprises a cental hole configured to be aligned with said coolant channel of said coolant feeding element upon assembly;
(J) said at least one channel of said male, frusto-conical distributing element extends obliquely outwards away from said at least one central inlet opening; and
(K) said coolant feeding structure has an outer diameter;
said rotary tool shank has an outer diameter; and
said outer diameter of said coolant feeding structure is substantially equal to said outer diameter of said rotary tool shank.

17. The rotary tool according to claim 15, including all of (A), (B), (C), (D), (E), (F), (G), (H), (I), (J), and (K), wherein (A), (B), (C), (D), (E), (F), (G), (H), (I), (J), and (K) comprise:
(A) said portion of said female, frusto-conical portion of said coolant feeding element that mates with said male frusto-conical chamfer comprises a sealing face disposed at the periphery of said coolant feeding element; and
said sealing face has an axial height and angle, with respect to the central, logitudinal axis of said rotary tool, which is complementary to said male frusto-conical chamfer for sealing purposes;
(B) said male, frusto-conical distributing element has an axial height;
said coolant feeding element has an axial height; and
the axial height of said male, frusto-conical distributing element is smaller than the axial height of said coolant feeding element;
(C) said base of said male, frusto-conical distributing element is affixed to said rotary tool shank upon assembly;
(D) a plurality of different said male, frusto-conical distributing elements are provided for different rotary tools;
(E) said plurality of different male, frusto-conical distributing elements comprise a marking or a color marking for identification;
(F) said male, frusto-conical distributing element is axially spaced away from said outlet opening of said coolant channel of said coolant feeding element upon assembly;
(G) said base of said male, frusto-conical distributing element is disposed inside said female, frusto-conical portion of said coolant feeding element and is disposed away from said male frusto-conical chamfer upon assembly;
(H) said male, frusto-conical distributing element comprises plastic;
(I) said at least one inlet opening of said at least one channel of said male, frusto-conical distributing element comprises a cental hole aligned with said coolant channel of said coolant feeding element;
(J) said at least one channel of said male, frusto-conical distributing element extends obliquely outwards away from said at least one central inlet opening; and
(K) said coolant feeding element has an outer diameter;
said rotary tool shank has an outer diameter; and
said outer diameter of said coolant feeding element is substantially equal to said outer diameter of said rotary tool shank.

18. Device for supplying coolant into a shank (10) of a rotary tool, having an adjusting element (12) including a rear partial area (12A) having a central coolant channel (14) and a front partial area (12B) facing towards the rotary tool and having on its end a sealing face (30) in the shape of an envelope of cone for the shank (10) characterized in that in an adaptor (16) of the front partial area (12A), a separate distributing element (18) is provided, which includes an inlet opening (20) as well as several branch channels (22) branching off therefrom, for a distribution of the coolant, and the sealing face (30) is designed as a peripheral collar on the front face of the adaptor (16) and has an axial height (h3), which is adapted to a chamfer (32) provided on the shank end of the rotary tool and which cooperates with said chamfer in assembled condition for sealing purposes.

19. Device according to claim 18, including at least one of (A), (B), (C), (D), (E), (F), (G), (H), (I), (J), (K), (L), (M), and (N), wherein (A), (B), (C), (D), (E), (F), (G), (H), (I), (J), (K), (L), (M), and (N) comprise:
(A) the sealing face (30) is designed as a peripheral collar on the front face of the adaptor (16) and has an axial height (h3), which is adapted to a chamfer (32) provided on the shank end of the rotary tool and which cooperates with said chamfer in assembled condition for sealing purposes;
(B) the distributing element (18) has an axial height (h1), which is smaller than an axial height (h2) of the adaptor, and that the sealing face (30) in the shape of an envelope of cone protrudes over the distributing element (18) as a peripheral collar of the adaptor (16);
(C) the distributing element (18) is an insertion part located in the adaptor (16);
(D) the end of the distributing element (18) is fixed on the shank (10);
(E) differently designed distributing elements (18) are provided for different rotary tools;
(F) differently designed distributing elements (18) can be distinguished by a marking, in particular a color marking;
(G) the distributing element (18) has the shape of a truncated cone;
(H) the adaptor (16) has the shape of a truncated cone;
(I) the sealing face (30) forms the end part of the truncated cone-shaped adaptor (16);
(J) the distributing element (18) is axially spaced from an outlet opening (28) of the central coolant channel (14);
(K) an underside (24) of the truncated cone facing towards the shank is located inside the adaptor (16), retracted from the shank-side edge of the adaptor (16);
(L) the distributing element (18) is designed as a plastic part;
(M) the inlet opening (20) is designed as a central hole aligned with the coolant channel (14); and
(N) the branch channels (22) extend from the central inlet opening (20) obliquely outwards.

20. Device according to claim 18, including all of (A), (B), (C), (D), (E), (F), (G), (H), (I), (J), (K), (L), (M), and (N), wherein (A), (B), (C), (D), (E), (F), (G), (H), (I), (J), (K), (L), (M), and (N) comprise:
(A) the sealing face (30) is designed as a peripheral collar on the front face of the adaptor (16) and has an axial height (h3), which is adapted to a chamfer (32) provided on the shank end of the rotary tool and which cooperates with said chamfer in assembled condition for sealing purposes;
(B) the distributing element (18) has an axial height (h1), which is smaller than an axial height (h2) of the adaptor, and that the sealing face (30) in the shape of an envelope of cone protrudes over the distributing element (18) as a peripheral collar of the adaptor (16);
(C) the distributing element (18) is an insertion part located in the adaptor (16);
(D) the end of the distributing element (18) is fixed on the shank (10);

(E) differently designed distributing elements (18) are provided for different rotary tools;
(F) differently designed distributing elements (18) can be distinguished by a marking, in particular a color marking;
(G) the distributing element (18) has the shape of a truncated cone;
(H) the adaptor (16) has the shape of a truncated cone;
(I) the sealing face (30) forms the end part of the truncated cone-shaped adaptor (16);
(J) the distributing element (18) is axially spaced from an outlet opening (28) of the central coolant channel (14);
(K) an underside (24) of the truncated cone facing towards the shank is located inside the adaptor (16), retracted from the shank-side edge of the adaptor (16);
(L) the distributing element (18) is designed as a plastic part;
(M) the inlet opening (20) is designed as a central hole aligned with the coolant channel (14); and
(N) the branch channels (22) extend from the central inlet opening (20) obliquely outwards.

\* \* \* \* \*

UNITED STATES PATENT AND TRADEMARK OFFICE
CERTIFICATE OF CORRECTION

| | | |
|---|---|---|
| PATENT NO. | : 8,251,621 B2 | Page 1 of 1 |
| APPLICATION NO. | : 12/101780 | |
| DATED | : August 28, 2012 | |
| INVENTOR(S) | : Dirk Kammermeier | |

It is certified that error appears in the above-identified patent and that said Letters Patent is hereby corrected as shown below:

Title Page, Item (30):
Please add the following information in the first column of the Front Page.
--Foreign Application Priority Data
Oct. 11, 2005  (DE)  10 2005 048 635.5
Oct. 9, 2006   PCT/EP2006/009728--

Signed and Sealed this
Nineteenth Day of February, 2013

Teresa Stanek Rea
*Acting Director of the United States Patent and Trademark Office*

UNITED STATES PATENT AND TRADEMARK OFFICE
CERTIFICATE OF CORRECTION

| | |
|---|---|
| PATENT NO. | : 8,251,621 B2 |
| APPLICATION NO. | : 12/101780 |
| DATED | : August 28, 2012 |
| INVENTOR(S) | : Dirk Kammermeier et al. |

It is certified that error appears in the above-identified patent and that said Letters Patent is hereby corrected as shown below:

IN THE SPECIFICATIONS

In Column 4, Line 42, delete "FIG. 3." and insert -- FIG. 3, --, therefor.
In Column 4, Line 48, before "DESCRIPTION" insert -- DETAILED --.
In Column 18, Line 31, delete "seals" and insert -- seal, --, therefor.

IN THE CLAIMS

In Column 21, Line 14, in Claim 2, delete "logitudinal" and insert -- longitudinal --, therefor.
In Column 21, Line 45, in Claim 10, delete "cental" and insert -- central --, therefor.
In Column 21, Line 65, in Claim 13, delete "logitudinal" and insert -- longitudinal --, therefor.
In Column 22, Line 26, in Claim 13, delete "cental" and insert -- central --, therefor.
In Column 22, Line 44, in Claim 14, delete "logitudinal" and insert -- longitudinal --, therefor.
In Column 23, Line 5, in Claim 14, delete "cental" and insert -- central --, therefor.
In Column 24, Line 40, in Claim 16, delete "logitudinal" and insert -- longitudinal --, therefor.
In Column 25, Line 3, in Claim 16, delete "cental" and insert -- central --, therefor.
In Column 25, Line 23, in Claim 17, delete "logitudinal" and insert -- longitudinal --, therefor.
In Column 25, Line 51, in Claim 17, delete "cental" and insert -- central --, therefor.

Signed and Sealed this
Twenty-eighth Day of May, 2013

Teresa Stanek Rea
*Acting Director of the United States Patent and Trademark Office*